United States Patent
Leff et al.

(10) Patent No.: US 8,880,549 B2
(45) Date of Patent: Nov. 4, 2014

(54) CONCURRENT DATABASE ACCESS BY PRODUCTION AND PROTOTYPE APPLICATIONS

(75) Inventors: Avraham Leff, Spring Valley, NY (US); James T. Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/615,252

(22) Filed: Nov. 9, 2009

(65) Prior Publication Data

US 2011/0113019 A1    May 12, 2011

(51) Int. Cl.
- G06F 7/00 (2006.01)
- G06F 17/00 (2006.01)
- G06F 17/30 (2006.01)

(52) U.S. Cl.
CPC .................. *G06F 17/3056* (2013.01)
USPC ............. 707/769; 707/607; 707/609

(58) Field of Classification Search
CPC ............ G06F 17/30722; G06F 17/30011; G06F 17/3061; G06F 17/30867; G06F 17/3064; G06F 17/30643; G06F 17/30684; G06F 17/30707
USPC ............ 707/2, 618, 100, 930; 711/130; 718/100; 1/1
See application file for complete search history.

(56) References Cited

U.S. PATENT DOCUMENTS

| | | | |
|---|---|---|---|
| 5,930,795 A * | 7/1999 | Chen et al. | 1/1 |
| 6,341,291 B1 * | 1/2002 | Bentley et al. | 1/1 |
| 7,444,567 B2 | 10/2008 | Wang et al. | |
| 7,448,017 B2 | 11/2008 | Barrett et al. | |
| 7,533,124 B2 * | 5/2009 | Hellman et al. | 1/1 |
| 8,103,710 B1 * | 1/2012 | Lee | 707/930 |
| 2002/0029218 A1 * | 3/2002 | Bentley et al. | 707/100 |
| 2008/0010243 A1 * | 1/2008 | Weissman et al. | 707/2 |
| 2008/0244184 A1 * | 10/2008 | Lewis et al. | 711/130 |
| 2008/0244582 A1 * | 10/2008 | Brown et al. | 718/100 |
| 2010/0063959 A1 * | 3/2010 | Doshi et al. | 707/618 |

OTHER PUBLICATIONS

Park-et al.; "Logically clustered architectures for networked databases"; Distributed & Parallel Databases, vol. 10, No. 2, pp. 161-198; Sep. 2001.

Freund, U.; "Multi-Level System Integration based on AUTOSAR"; ACM Digital Library; Jan. 8, 2005; ICSE May 2008. p. 581.

Tolia-et al.; "Improving Mobile Database Access Over Wide-Area Networks Without Degrading Consistency"; ACM Library; 2007 pp. 71-84.

* cited by examiner

*Primary Examiner* — Susan Chen
(74) *Attorney, Agent, or Firm* — Ido Tuchman; William J. Stock (57) ABSTRACT

A database manager, computer program product and methods for managing a database utilized by multiple applications. In one embodiment, the database manager performs a database record change to database records by a first application. The database manager branches the database records such that the database record change is visible to the first application and is not visible to one or more other applications accessing the database. The database manager can merge database record changes made by the other applications such that database schema changes made by the other applications are visible to the first application.

13 Claims, 7 Drawing Sheets

CONCURRENT DATABASE ACCESS BY PRODUCTION AND PROTOTYPE APPLICATIONS

BACKGROUND OF THE INVENTION

Field of the Invention

Agile software development has become a popular methodology for creating and maintaining software applications. While there are many variations on its implementation, agile development often involves rapid prototyping of software applications. Rapid software prototyping typically entails quickly coding a working model of the software application and iteratively refining the product until a set of requirements is achieved.

Many software applications, especially web-based applications, utilize a database to store information. For example, a software application may store information about user accounts, such as a user's name and email address, in a database. Program logic can create, read and modify database records according to the objectives of the software application.

Often, a software application may need to be modified in order to support a new feature. For example, the database may be modified to store passwords in the user accounts and the application may require users to login using their password. However, modifying a software application in a production environment can be problematic. The rapid coding cycles of agile development typically introduce programming errors in the application or even cause the application to crash. These bugs are often resolved in subsequent programming iterations, but can be unacceptable in a production application.

To overcome such potential problems, software developers typically create a development environment in which the updated software application can be executed and debugged. The development environment helps ensure that any crashes, data corruption or other mishaps that can occur while developing software is isolated from the production software application. Thus, a software crash in the development environment due to changes in the database does not bring down the production application or corrupt the existing database records.

The development environment, however, may not always accurately recreate the production environment in which the software application is deployed. For example, the development environment database may not contain all the records of the real world database. This often occurs when the real world database is too large to be copied into the development environment. For example, copying the production environment to the development environment can take a long time, and thus can slow development.

When the development environment does not reproduce the production environment there is a risk that software errors can be missed in the development environment.

SUMMARY OF THE INVENTION

Aspects of the present invention include a methodology in which data used by a software prototype system is kept isolated from data used by a software production system, while still maintaining both versions in the same database. Since the prototype and production systems are kept in the same database, there is no need for developers or administrators to set up duplicate hardware or to copy information from the production database to the prototype database.

In addition, aspects of the present invention include a methodology for merging changes made to the prototype database schema back into the production database. Application developers need not specify which version of the data they want to access. Instead, middleware selects the appropriate data version automatically. The middleware is not dependent on a particular database API, as long as the API provides the ability to read/write data, query data, and update metadata (e.g., add/remove/change column).

A particular aspect of the invention is a method for managing a database utilized by a plurality of software applications. The method includes storing database records utilized by the plurality of software applications in the database. A performing operation performs a database record change to at least one of the database records by a first application of the plurality of software applications. A branching operation branches the database records such that the database record change is visible to the first application and is not visible to one or more other applications of the plurality of software applications accessing the database.

Another aspect of the invention is a system for managing a database utilized by a plurality of software applications. The system includes a database manager configured to receive a database record change request to change one or more database records of a database from a first application. The first application is one of the plurality of software applications utilizing the database, and the database records are stored in a computer readable storage medium. The database manager is further configured to branch the database records such that changes to the database records are visible to the first application and are not visible to one or more other applications of the plurality of software applications accessing the database.

Yet another aspect of the invention is a computer program product for managing a database utilized by a plurality of software applications. The computer program product includes computer readable program code configured to: receive a database record change request to change one or more database records of the database from a first application; branch the database records such that changes to the database records are visible to the first application and are not visible to one or more other applications of the plurality of software applications accessing the database.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-9.

Figure 1:
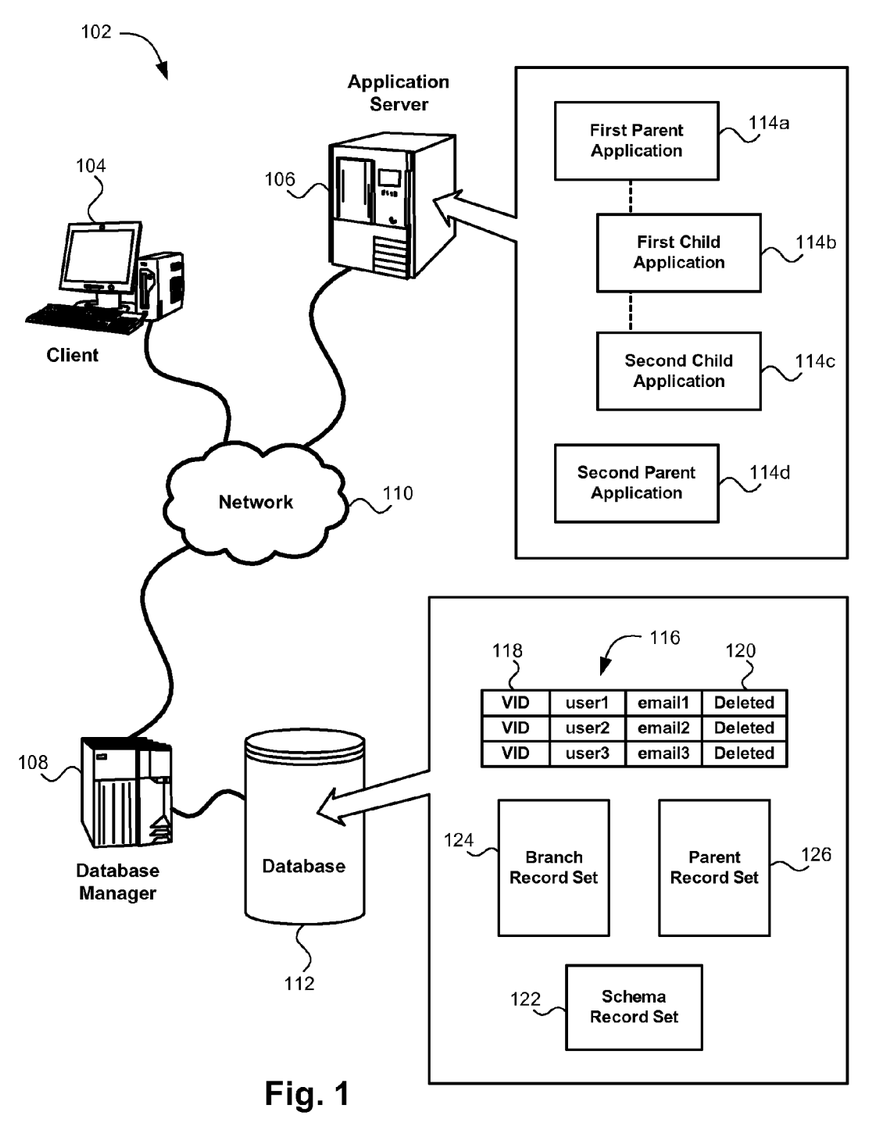
FIG. 1 shows an example system 102 employing the present invention.

Turning now to FIG. 1, an example system 102 employing the present invention is shown. It is noted that the system 102 shown is just one example of various arrangements of the present invention and should not be interpreted as limiting the invention to any particular configuration.

The system 102 includes a client computer 104, an application server 106 and a database manager 108 coupled to a computer network 110. The client 104 accesses one or more software applications 114a-114d executing at the application server 106. For example, the application server 106 may execute a movie rental software application allowing the client 104 to request movie delivery over the computer network 110.

It is important to note that the terms "software application" and "application", as used herein, refer to a particular software program. These terms are distinct from "application instances" of a software application. Application instances of the same software application are not different software applications. Rather, they are the same software application with different memory stacks.

Applications 114a-114d executing at the application server 106 access a database 112 via the database manager 108. The database 112 stores information used by the applications. For example, a software application 114a-114d may store user account information, such as a user's name and email address, in the database 112. Typically, a database stores database records 116 in a computer readable storage medium. The way the database records 116 are organized is referred to as the database schema.

It is envisioned that in one embodiment of the invention, the application server 106 executes different versions of an application. For example, child applications 114b and 114c represent development versions of a production (parent) application 114a. The child versions 114b and 114c may include experimental features under test by the software developers.

In the example of a movie rental software application, the first parent application 114a may be a stable version of the application used by a majority of the rental customers. The first and second child applications 114b and 114c represent development versions of the rental software application. These versions, for example, may use experimental movie suggestion algorithms that recommend movies to customers based on past selections. A subset of customers (sometimes referred to as "beta testers") may be invited or may opt-in to use the development versions of the application. Moreover, the child application versions 114b and 114c may still be in development and may yield unpredictable results, potentially corrupt data or cause the application to crash.

Although the parent application 114a and the child applications 114b and 114c may be similar, they may access and modify the database records 116 in different ways. The child versions 114b and 114c may calculate and record different data than the parent application 114a. Moreover, the child applications may use different database schemata from the parent application 114a. For example, the child applications 114b and 114c may add new or remove data columns to the record set or use different database tables.

As discussed in more detail below, the database manager 108 is aware of the different applications and application versions using the same database 112. The database manager 108 "forks" or "branches" the database 112 for each application. Branching the database 112 allows the various applications to concurrently use the database 112 such that changes to the database records are visible to the first application 114a and are not visible to one or more other applications 114b-114d accessing the database.

More particularly, when a prototype application 114b changes or creates data in the database 112, this data is not visible to the production application 114a. Thus, each application 114a-d has a context that is passed to the database manager 108. The database manager 108 reads the application's context and shows either a trunk version or a branch/prototype version of the database.

In one embodiment of the invention, the database 112 is a relational database. However, other types of database architectures known to those skilled in the art may be used. Such database architectures include, but are not limited to, datastore databases (i.e., key-value pairs), document-oriented databases (i.e., XML based), and flat file databases (partial relational).

A database management system (DBMS) helps organize, query and edit records 116 in the database 112. In one embodiment of the invention, a DBMS is incorporated within the database manager 108. Alternatively, the DBMS may be incorporated within the database 112. In this latter configuration, the database manager 108 acts as middleware and sits on top of the DBMS layer. The database manager 108 and the database 112 may be in close physical proximity to each other, or may be located far apart. Thus, communication between the database manager 108 and the database 112 may be carried out over the network 110.

In response to a database record change request, the database manager 108 branches the database records 116 such that the changes to the database records 116 are visible to the first application 114a and are not visible to the child applications 114b and 114c of the first application 114a. The database manager 108 then changes the database records 116 in a branch associated with the first application 114a either directly, or, for example, through the DBMS.

The network 110 may be any of a wide variety of networks known in the art for allowing two or more computer systems to communicate. The network 110 may include the Internet, a public switched telephone network (PSTN), local area networks (LAN's) and wide area networks (WAN's). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network 110 may include various topologies and protocols known to those skilled in the art, such as TCP/IP, UDP, and Voice over Internet Protocol (VoIP). The network may comprise direct physical connections, radio waves, microwaves or any combination thereof. Furthermore, the network 110 may include various networking devices known to those skilled in the art, such as routers, switches, bridges, repeaters, etc.

The client 104 may be a general-purpose computer or a machine dedicated to communicating with and supporting the software applications 114a-114d executing at the application server 106. In a particular embodiment of the invention, the client 104 includes a javascript enabled web browser capable of communicating with the application server 106 over the network 110 using a TCP/IP protocol.

Likewise, the application server 106 may be a general-purpose computer or a dedicated machine for executing the software applications 114a-114d. The application server 106 may alternatively be a load balanced node cluster. Moreover, the application server 106 may be virtualized on a cloud computing service.

For simplicity, the application server 106 is depicted as hosting and executing instances of different software applications 114a-114d. The software applications 114a-114d, however, do not necessarily have to be hosted and executed at the same application server 106. The system 102 may include a plurality of application servers 106 executing instances of different software applications 114a-114d.

As mentioned above, database records 116 are utilized by the plurality of software applications 114a-114d. Thus, at least one software application 114a-114d can perform a database record change to least one of the database records 116. As used herein, a database record change includes modifying, creating and deleting a database record. A database record change may further include a change in a database's schema.

As mentioned above, the database manager 108 may be aware of the different applications and application versions using the same physical database 112. In one embodiment of the invention, when a new application using the database 112 is introduced, the database manager 108 branches the database records 116 such that subsequent changes to the database records 116 are visible to the application 114a making the changes and are not visible to any child applications 114b and 114c of the first application 114a accessing the database 112.

In one embodiment of the invention, the database manager 108 is configured to receive a database record access and modification requests from the applications 114a-d. The database record requests can be API calls to the database manager 108 to access or change one or more database records 116 of the database 112. In a particular embodiment of the invention, API calls to the database manager 108 include a version number parameter identifying the particular application version making the API call.

The database manager 108, upon examination of the version number parameter, determines if the application making the API call is a new application. If a new application is accessing the database 112, the database manager 108 branches the database.

In one embodiment of the invention, branching the database 112 includes recording version identifiers 118 in the database records. The version identifiers 118 delineate database records modified by applications 114a-d before a database branch is created from database records modified by applications 114a-d after the database branch is created.

The database manager 108 may be further configured to record a delete flag 120 in each of the database records 116 identifying whether the database record was deleted by at least one of the plurality of software applications. Thus, the delete flag keeps track of deleted database records for each application 114a-d.

The database manager 108 may be further configured to store a schema record set 122 in the database 112 identifying a schema state of the database for each application 114a-d. For example, the schema record set 112 describes the tables and columns available for each application 114a-d to access. In other words, the schema record set 112 stores metadata about the database 112 for each application 114a-d.

The database manager 108 may be further configured to store a branch record set 124 and a parent record set 126 in the database 112. The branch record set 124 identifies the most current version identifier 118 for each software application 114a-d. The parent record set 126 identifies a previous state of the database records 116, if any, for each version identifier 118.

The branch record set 124 and the parent record set 126 help the database manager 108 keep track of what data in the database 112 is visible to which application 114a-d. For example, when the database manager 108 receives a database query from a querying application, the database 112 is searched for one or more matching database records in the database satisfying the database query and visible to the querying application. The matching database records are then returned to the querying software application.

Thus, the database manager 108 can perform versioning in two dimensions. In the first dimension, the database manager 108 keeps track of the database schema for each of the software applications 114a-d. Such schema tracking can be accomplished using the schema record set 122. In the second dimension, changes to database records 116 by each software application 114a-d are tracked. Such record tracking is achieved by stamping database records with the version identifier 118, as well as by use of the branch record set 124 and the parent record set 126.

When applications query the database records 116, the database manager 108 returns different query results to different applications depending what the application should be seeing in the data space independent of what the application should be seeing in the schema space. In other words, the database manager 108 performs schema versioning and data versioning. The database manager 108 returns the correct view of the schema and data given the software application version.

As discussed in more detail below, the database manager 108 may traverse the parent record set starting at the current version identifier for the querying application such that all the version identifiers corresponding to the querying application are found. The database manager 108 then determines if the matching database records are visible to the querying application. This is achieved by comparing the version identifier of the matching database records with the version identifiers of the traversed parent record set 126.

Figure 2:
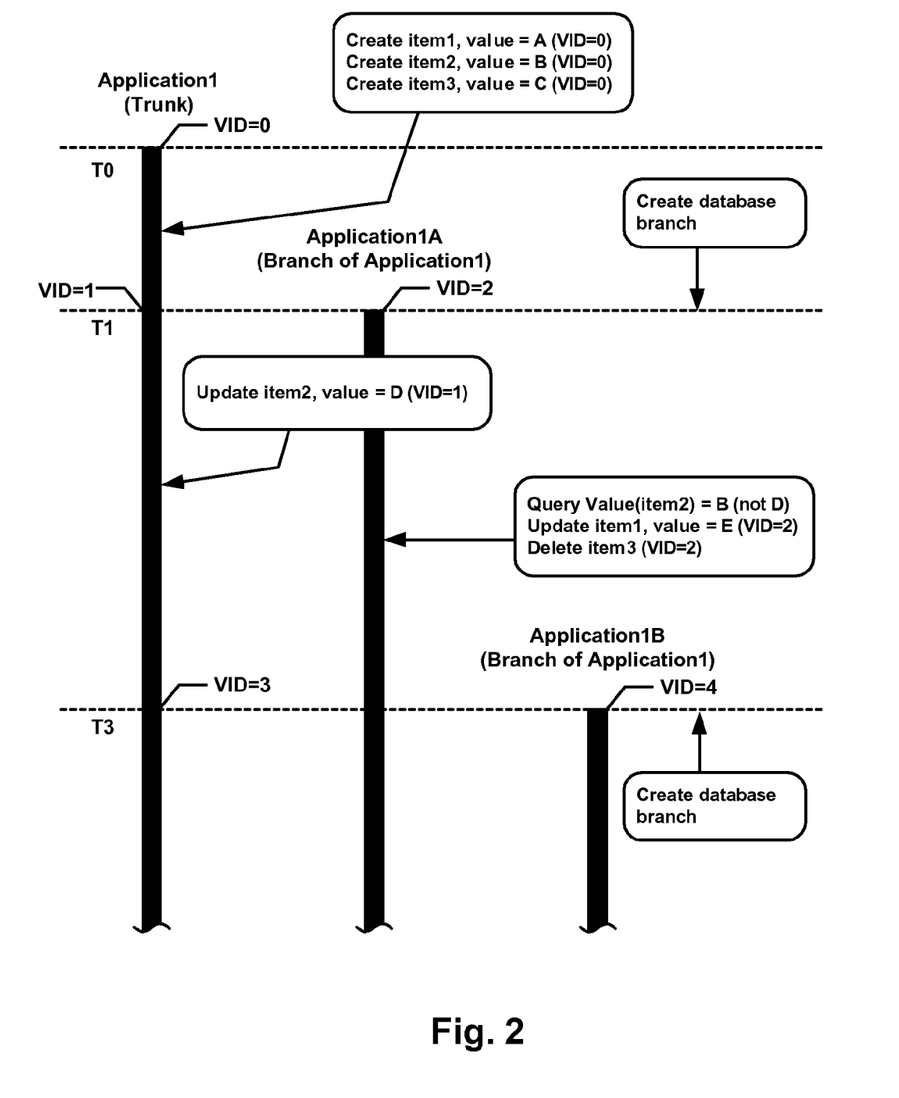
FIG. 2 illustrates how version identifications change as new applications accessing the same physical database are added by a database manager.

FIG. 2 illustrates how version identifications (VIDs) change as new applications accessing the same physical database are added by the database manager. As mentioned above, version identifiers delineate database records modified by applications before and after a database branch is created.

At a time T0, Application1 accesses the database for the first time via the database manager. In this example, Application1 is considered the "trunk" or production version of the application. Additionally, at time T0, the VID associated with Application1 is set to 0.

As mentioned above, the database manager maintains two record sets to keep track of what data is visible to which application: the parent record set and the branch record set. The parent record set identifies a previous state of the database records, if any, for each version identifier. Thus, the parent record set can be a linked list of version identifiers for a branch (or trunk). Stated a different way, the parent record set logs the commit sequence for the branch/trunk.

The branch record set names the beginning of the parent record set for a branch (or trunk). In other words, the branch record set logs the most recent version identifier for the branch/trunk.

Since, at time T0, Application1 is the only application accessing the database, the parent record set and branch record set are as follows:

| Parent Record Set (time = T0) | |
| --- | --- |
| VID | Parent |
| 0 | 0 |

| Branch Record Set (time = T0) | |
| --- | --- |
| Branch | VID |
| Application1 | 0 |

At a time T1, a second application, Application1A, accesses the database for the first time via the database manager. In this example, Application1A is a child or branch of Application1. In a particular configuration of the invention, Application1 is created using a version control system for software development. Examples of such systems are Subversion by CollabNet Inc. and Mercurial.

Before detailing the actions taken at T1, it noted that FIG. 2 lists the following actions taken by Application1 between time T0 and T1:
Create item1, value=A (VID=0)
Create item2, value=B (VID=0)
Create item3, value=C (VID=0)

Each of the database records (item1, item2 and item3) is assigned VID=0 since this is the current version identifier of Application1.

At time T1, the database manager branches the database such that the subquent changes to the database records are visible only to Application1 and not visible to any child applications of Application1. Specifically, Application1 is assigned VID=1 and Application1B is assigned VID=2. Thus, any further modifications of the database by Application1 are recorded with VID=1. Likewise, any modifications of the database by Application1A are recorded with VID=2.

Additionally, the parent record set is updated to reflect the fact that the previous state of database records associated with VID=1 and VID=2 is database records associated with VID=0. The branch record set is also updated so that the current VID of Application1 is 1 and the current VID of Application1A is 2. Thus, that parent record set and the branch record set contain the following values:

| Parent Record Set (time = T1) | |
| --- | --- |
| VID | Parent |
| 0 | 0 |
| 1 | 0 |
| 2 | 0 |

| Branch Record Set (time = T1) | |
| --- | --- |
| Branch | VID |
| Application1 | 1 |
| Application1A | 2 |

At a time after T1, Application1 updates item2 to a value of D. Since Application1 is now associated with version identifier VID=1, this updated record is also given a version identifier VID=1. As shown, if Application1A later queries the value of item2 in the database, the result returned by the database manager is B, not D. This is because the database manager traverses the parent record set starting at the current version identifier pointed to by the branch record set (VID=2 for Application1A) such that all the version identifiers corresponding to Application1A are found. Inspecting the current parent record set for Application1A it is clear that the database manager will not return a record associated with VID=1 as a query result. In other words, the branch record set tells the database manager the newest VID of a branch, while the parent record set tells the database manager where to find data if the manager can not find the data in the newest VID.

FIG. 2 also illustrates that subsequent modification of database records by Application1A are associated with VID=2. Thus, if item1 is changed by Application1A to a value of E, the change is associated with VID=2. This change to item1 is not visible to Application1. If Application1A deletes item3, as shown, a new record is created for item3 with a VID=2 and the delete flag set to True. Thus, item3 is deleted for Application1A, but not for Application1.

At a later time T2, a second child of Application1 (referred to as Application1B) accesses the database via the database manager for the first time. In response, the database branches the database once again. Since Application1B is a child of Application1, all previous database record set changes made by Application1 are visible to Application1B. However, record set changes made by child Application1A are not visible to Application1B.

This visibility hierarchy is achieved by assigning VID=3 to Application1 and VID=4 to Application1B. The version identifier of Application1A is left unchanged. The parent record set and the branch record set are updated as follows:

| Parent Record Set (time = T2) | |
| --- | --- |
| VID | Parent |
| 0 | 0 |
| 1 | 0 |
| 2 | 0 |
| 3 | 1 |
| 4 | 1 |

| Branch Record Set (time = T2) | |
| --- | --- |
| Branch | VID |
| Application1 | 3 |
| Application1A | 2 |
| Application1B | 4 |

During a database query, the database manager searches for one or more matching database records in the database satisfying the database query and visible to the querying application. The matching database records are returned to the querying application.

In the case of a query from Application1B, the database manager first checks the current VID of Application1B in the branch record set. The database manager then traverses the parent record set starting at VID=4 to find parent VIDs of Application1B. The traversal returns parent VIDs 1 and 0. Thus, a query for the value of item2 may potentially be found in records with VIDs of 4, 1 and 0. If there are conflicting query results, the most recent VID will contain the correct record value.

In one embodiment of the invention, the database manager also maintains a schema record set specifying the database schema for each application using the database. For example, Application1A and Application1B may change Application1's database schema. Each application's schema is recorded in the schema record set so that the correct tables and table columns are accessed and queried by the database manager.

It is contemplated that database branches may be merged. In one embodiment of the invention, database row instances created or modified by the branch are eventually discarded after they are no longer needed. However, schema changes in the branch application may be merged into the parent application. In one embodiment, this occurs when the branch-application source code is merged into the production source code.

The use scenario discussed above involves a trunk application and two branch applications thereof. Those skilled in the art will recognize that the database manager can also handle multiple trunk applications. For example, if a new trunk Application2 is introduced at time T4>T3, the parent record set and the branch record set may be updated as follows:

| Parent Record Set (time = T2) | |
|---|---|
| VID | Parent |
| 0 | 0 |
| 1 | 0 |
| 2 | 0 |
| 3 | 1 |
| 4 | 1 |
| 5 | 5 |

| Branch Record Set (time = T2) | |
|---|---|
| Branch | VID |
| Application1 | 3 |
| Application1A | 2 |
| Application1B | 4 |
| Application2 | 5 |

In one embodiment of the invention, a branch can be created for identical software applications. For example, a developer may want to experiment with test data (i.e., fictitious user accounts) without creating a development environment. Thus, this embodiment supports branching of the database without necessarily branching the software application.

As discussed above, a software versioning tool can be used to keep track of different versions of a software application. When a new application version is developed, the versioning tool branches or forks the application such that changes to the trunk are tracked. In this way, changes to the trunk version of the application can be tracked and, if necessary, undone. It is contemplated that in one embodiment of the invention, the database manager is coupled to the software versioning tool such that there is a one to one correspondence between database branches and code branches created by the software versioning tool.

Figure 3:
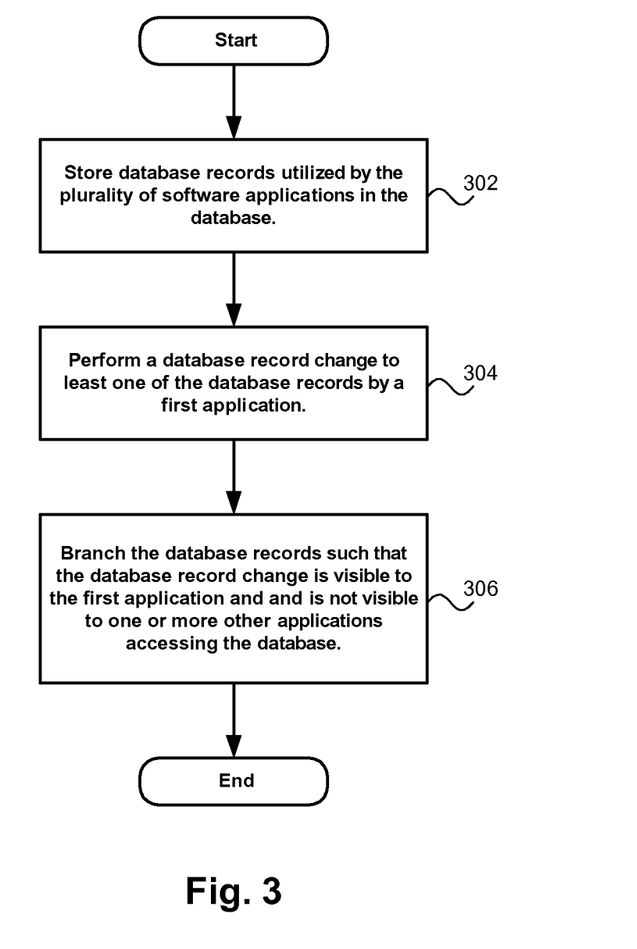
FIG. 3 shows an example flowchart for managing a database utilized by a plurality of software applications.

Turning FIG. 3, an example method for managing a database utilized by a plurality of software applications is illustrated. The method begins at storing operation 302 and includes storing database records utilized by the plurality of software applications in the database. As mentioned above, the database records may be stored in a computer readable storage medium. After storing operation 302 is completed, control passes to performing operation 304.

At performing operation 304, a database record change is performed to least one of the database records by a first application. The first application is one of the plurality of software applications utilizing the database records. As mentioned above, a database record change includes modifying, creating and deleting a database record. A database record change may further include a change in the database schema. A schema change can include, for example, a change in the data record's stored data type and/or the data record's default value. After performing operation 304 is completed, control passes to branching operation 306.

At branching operation 306, the database records are branched such that the database record change is visible to the first application and is not visible to one or more other applications of the plurality of software applications accessing the database.

Figure 4:
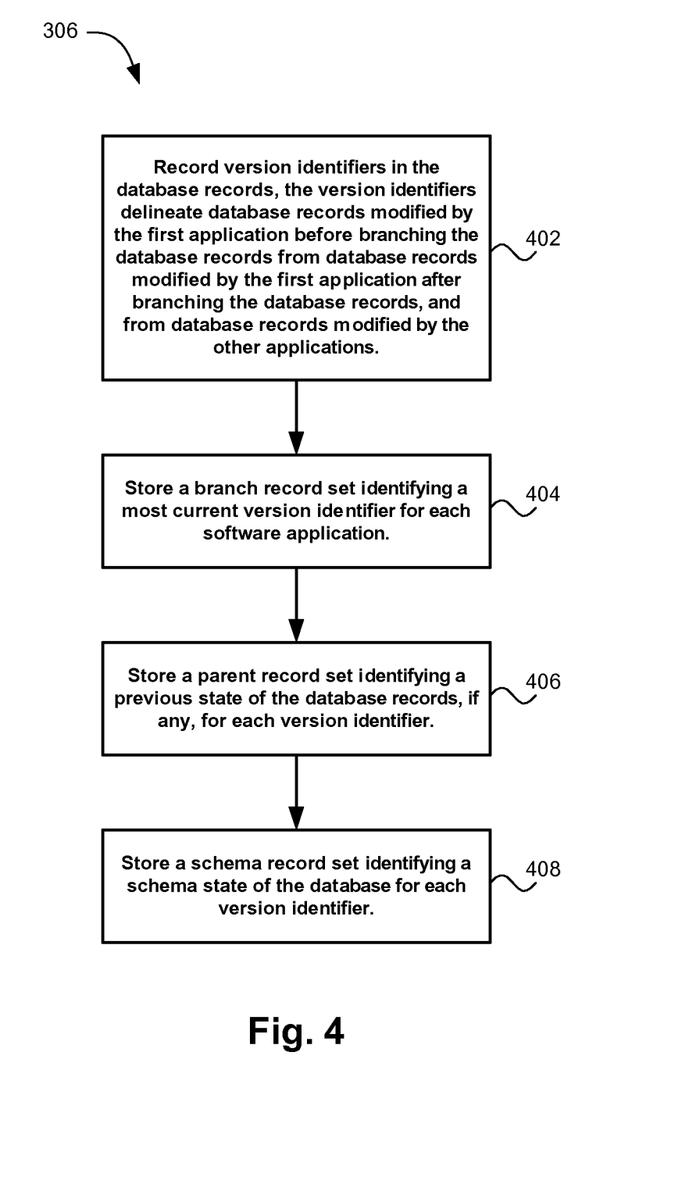
FIG. 4 shows additional operations included in the branching operation of FIG. 3.

In a particular embodiment of the invention, operations included in branching operation 306 are shown in FIG. 4. A recording operation 402 records version identifiers (VIDs) in the database records. The version identifiers delineate database records modified by the first application before branching the database records from database records modified by the first application after branching the database records. The version identifiers further delineate database records modified by the first application from database records modified by the other applications.

Thus, the application database schema may be augmented with version IDs, allowing the database manager to determine which database rows belong to the production application verses the prototype application. The production application reads and writes the rows marked with the production VID. The prototype application reads and writes the prototype versioned rows, if they exist, or otherwise reads the production rows. The prototype application writes a prototype versioned row, in order to maintain isolation between the production and prototype data. The database manager automatically determines whether data API calls come from the production or prototype application.

The branching operation 306 additionally includes storing operations 404 and 406. Storing operation 404 stores a branch record set identifying the most current version identifier for each software application. Storing operation 406 stores a parent record set identifying the previous state of the database records, if any, for each version identifier.

The branching operation 306 may further include storing operation 408. In storing operation 408, a schema record set is stored identifying a schema state of the database for each of the plurality of applications utilizing the database.

In one embodiment of the invention, when the prototype application adds a new column, the new column is added to a shared database schema. However, the production application is not allowed to access the new column. When the prototype application removes a column, the prototype application is no longer able to access that column, but the column remains in the database for access by the production application.

In one embodiment, when the prototype application changes a column type (e.g., changing the column's data-type or changing the semantics of the data (e.g., the units associated with column's value)), a new column is created in the shared database schema. Writes by the production application use the old column, and writes by the prototype application use the new column. When the prototype application reads a row which was written by the production application, the changed columns are automatically converted to the new format by the database manager. The code used by the database manager to convert between old and new schema is known as "transfer functions".

Figure 5:
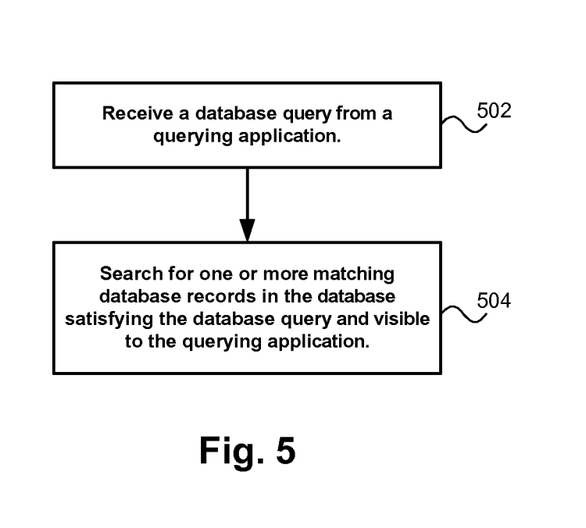
FIG. 5 shows an example flowchart for querying data by a software application, as contemplated by the present invention.

FIG. 5 shows a further example method contemplated by the present invention. The method includes a receiving operation 502 for receiving a database query from a querying application. As mentioned, a plurality of software applications may access the database and the querying application is one of these applications. After the receiving operation 502 is completed, operation flow moves to searching operation 504.

At searching operation 504, the database manager searches for one or more matching database records in the database. The matching database records must both satisfy the database query issued by the querying application and be visible to the querying application.

Figure 6:
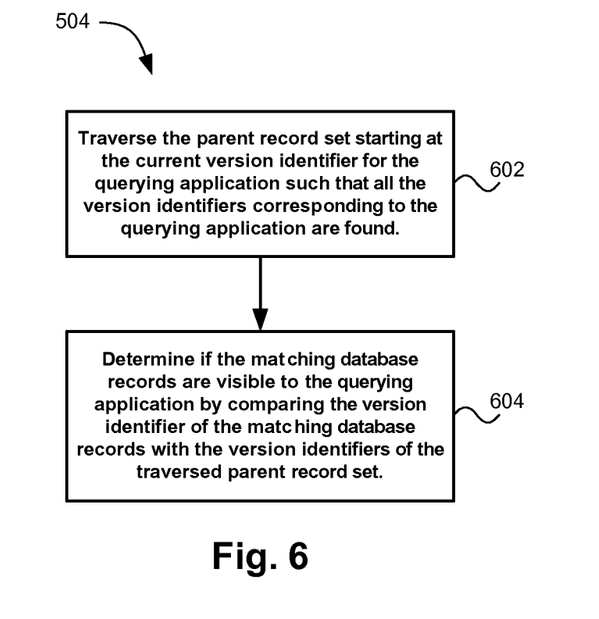
FIG. 6 shows additional operations included in the searching operation of FIG. 5.

In a particular embodiment of the invention, operations included in searching operation 504 are shown in FIG. 6. At traversing operation 602 the database manager traverses the parent record set starting at the current version identifier for the querying application such that all the version identifiers corresponding to the querying application are found. After traversing operation 602 is completed, control passes to determining operation 604.

At determining operation 604, the database manager determines if the matching database records are visible to the querying application by comparing the version identifier of the matching database records with the version identifiers of the traversed parent record set. The database manager may further check the querying application's schema record set to ensure that the matching database records fall within the querying application's schema.

Figure 7:
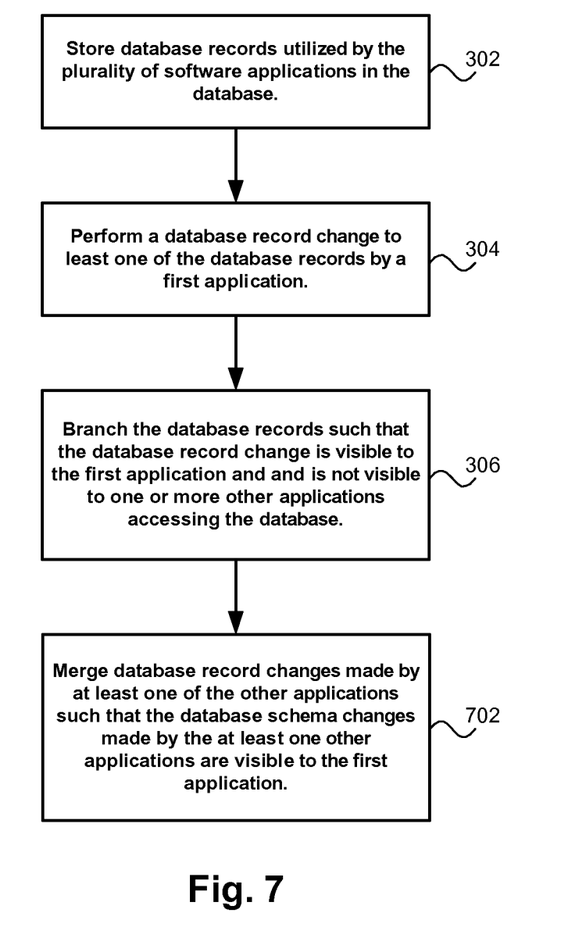
FIG. 7 shows a further example method of operation contemplated by the present invention.

Another method embodiment is now described with reference to flowchart of FIG. 7. The method may include the operations 302, 304, and 306 of FIG. 3. The method may additionally include merging operation 702.

At merging operation 702, database record changes made by at least one of the other applications are merged such that the database schema changes made by the other applications are visible to the first application. A mentioned above, when two or more applications are merged, row instances that were created or modified as part of the branching application are discarded. Only the schema data is carried over to the parent application. It is contemplated that other embodiments of the invention may merge both the schema and data of branch applications, or branch data may be saved as an archival record.

For new columns, a default value is written into the database for each row of the parent application. In other embodiments, the database automatically supplies the default values. For removed columns, the column is removed from the shared database schema. For column changes, the system will convert the old column data into the new column format, using either conversion code supplied by the developer (transfer functions), or using built-in conversions.

The schema changes and data conversions may take place over a period of time while the parent application (using the formerly-branch code) remains in operation. The database manager will convert data as necessary for the formerly-branch code to use until the conversion is completed. Thus, there is no interruption in the production environment.

Figure 8:
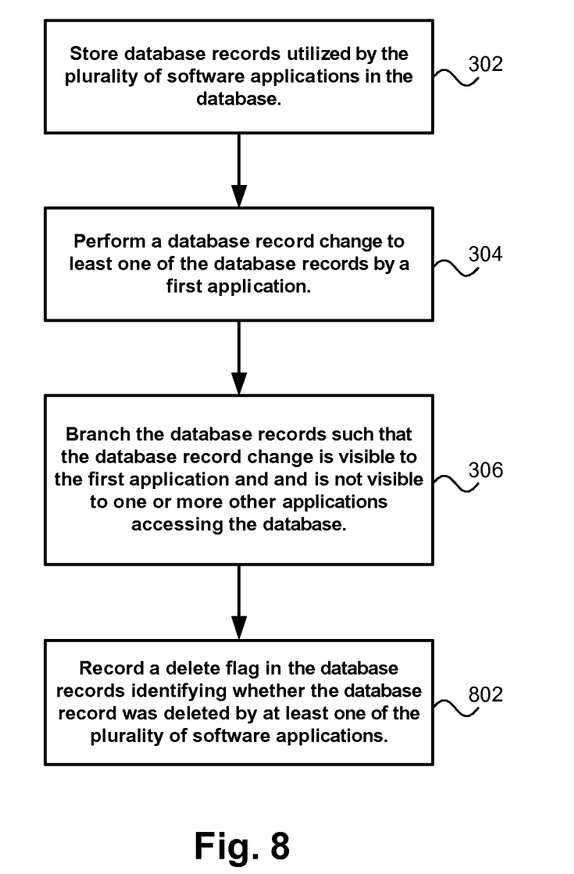
FIG. 8 shows another example method of operation contemplated by the present invention.

FIG. 8 shows another example method of operation contemplated by the present invention. The method may include the operations 302, 304, and 306 of FIG. 3. The method may additionally include merging operation 802. At recording operation 802, the database manager records a delete flag in the database records. The delete flag identifies whether the database record was deleted by a software application.

As discussed above, embodiments of the present invention provide a methodology in which data used by a software prototype system is kept isolated from data used by a software production system, while still maintaining both versions in the same database. Embodiments of the invention may help eliminate the cost of having to setup a development system separate from the production system. Prototype applications that are mostly working may be made available to selected users as a trial version. In this case, the trial-prototype application reads and writes production data. The middleware converts to the new data-schema on read, and writes the new data-schema format to the database. The middleware converts data written by prototype applications (in the new schema format) for use by current production (non-prototype) applications on database reads.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for managing a database utilized by a plurality of software applications, the method comprising:
   storing database records utilized by the plurality of software applications in the database, the database records being stored in a computer readable storage medium;
   performing, by a microprocessor, a database record change to least one of the database records by a development version of an application; and
   branching the database records, by the microprocessor, such that the database record change is visible to the development version of the application and is not visible to a production version of the application accessing the database, wherein the development version of the application is a different version of the production version of the application;
   wherein branching the database includes recording version identifiers in the database records, the version identifiers delineate database records modified by the development version of the application before and after branching the database records, and delineate database records modified by the development version of the application from database records modified by the production version of the application;
   storing a branch record set identifying a most current version identifier for each software application;
   storing a parent record set identifying a previous state of the database records, if any, for each version identifier;
   receiving a database query from the development version of the application;
   searching for one or more matching database records in the database satisfying the database query and visible to the development version of the application;
   returning the matching database records to the development version of the application;
   wherein searching for one or more matching database records in the database satisfying the database query further comprises:
   traversing the parent record set starting at the current version identifier for the development version of the application such that all the version identifiers corresponding to the development version of the application are found; and
   determining if the matching database records are visible to the development version of the application by comparing the version identifier of the matching database records with the version identifiers of the traversed parent record set.

2. The method of claim 1, further comprising storing a schema record set identifying a schema state of the database for development version of the application and a parent version of the application.

3. The method of claim 1, further comprising merging database record changes made by the development version of the application such that database schema changes made by the development version of the application are visible to the production version of the application.

4. The method of claim 1, further comprising recording a delete flag in the database records identifying whether the database record was deleted by the development version of the application.

5. The method of claim 1, wherein the development version of the application includes source code altered from original source code of the production version of the application.

6. A database system comprising:
   a microprocessor;
   a database manager coupled to the microprocessor and configured to:
   receive a database record change request to change one or more database records of a database from a development version of an application, the database records being stored in a computer readable storage medium, the development version of the application being a different version of a production version of the application;

branch the database records such that changes to the database records are visible to the development version of the application and are not visible to the production version of the application accessing the database; and change the database records in a first branch associated with the development version of the application;

wherein the database manager is further configured to record version identifiers in the database records, the version identifiers delineating database records modified by the development version of the application before a database branch is created from database records modified by the development version of the application after the database branch is created, and the version identifiers delineating database records modified by the development version of the application from database records modified by the production version of the application;

a branch record set identifying a most current version identifier for each software application;

a parent record set identifying a previous state of the database records, if any, for each version identifier;

wherein the database manager is further configured to:

receive a database query from the development version of the application;

search for one or more matching database records in the database satisfying the database query and visible to the development version of the application;

return the matching database records to the development version of the application;

traverse the parent record set starting at the current version identifier for the development version of the application such that all the version identifiers corresponding to the development version of the application are found; and determine if the matching database records are visible to the development version of the application by comparing the version identifier of the matching database records with the version identifiers of the traversed parent record set.

7. The system of claim 6, wherein the database manager is further configured to store a schema record set identifying a schema state of the database for development version of the application and a parent version of the application.

8. The system of claim 6, wherein the database manager is further configured to merge database record changes made by the development version of the application such that database schema changes made by the development version of the application are visible to the production version of the application.

9. The system of claim 6, wherein the database manager is further configured to record a delete flag in the database records identifying whether the database record was deleted by the development version of the application.

10. A computer program product for managing a database utilized by a plurality of software applications, the computer program product comprising:

a non-transitory computer readable storage medium having computer readable program code embodied therewith, the non-transitory computer readable program code configured to:

receive a database record change request to change one or more database records of the database from a development version of an application, the development version of the application being a different version of a production version of the application;

branch the database records such that changes to the database records are visible to the development version of the application and are not visible to the production version of the application accessing the database; and change the database records in a first branch associated with the development version of the application;

wherein the computer readable program code is further configured to record version identifiers in the database records, the version identifiers delineating database records modified by the development version of the application before a database branch is created from database records modified by the development version of the application after the database branch is created, and the version identifiers delineating database records modified by the development version of the application from database records modified by the production version of the application;

a branch record set identifying a most current version identifier for each software application; and a parent record set identifying a previous state of the database records, if any, for each version identifier;

wherein the computer readable program code is further configured to:

receive a database query from the development version of the application;

search for one or more matching database records in the database satisfying the database query and visible to the development version of the application;

return the matching database records to the development version of the application;

traverse the parent record set starting at the current version identifier for the development version of the application such that all the version identifiers corresponding to the development version of the application are found; and determine if the matching database records are visible to the development version of the application by comparing the version identifier of the matching database records with the version identifiers of the traversed parent record set.

11. The computer program product of claim 10, wherein the computer readable program code is further configured to store a schema record set identifying a schema state of the database for development version of the application and a parent version of the application.

12. The computer program product of claim 10, wherein the computer readable program code is further configured to merge database record changes made by the development version of the application such that the database schema changes made by the development version of the application are visible to the production version of the application.

13. The computer program product of claim 10, wherein the computer readable program code is further configured to record a delete flag in the database records identifying whether the database record was deleted by the development version of the application.

* * * * *